(12) United States Patent
Petrucci, III et al.

(10) Patent No.: US 10,419,576 B2
(45) Date of Patent: Sep. 17, 2019

(54) COMMUNICATION MANAGEMENT APPARATUS AND METHOD WITH DATA SELECTION BASED ON DATA HIERARCHY

(71) Applicant: The Leadership Analytics Group, LLC, Downingtown, PA (US)

(72) Inventors: Anthony Petrucci, III, Downingtown, PA (US); Michael J. Rivera, Huntingdon Valley, PA (US); Clifford A. Tironi, Philadelphia, PA (US)

(73) Assignee: The Leadership Analytics Group, LLC, Downingtown, PA (US)

( * ) Notice: Subject to any disclaimer, the term of this patent is extended or adjusted under 35 U.S.C. 154(b) by 244 days.

(21) Appl. No.: 15/431,101

(22) Filed: Feb. 13, 2017

(65) Prior Publication Data

US 2017/0249368 A1 Aug. 31, 2017

Related U.S. Application Data

(60) Provisional application No. 62/299,767, filed on Feb. 25, 2016.

(51) Int. Cl.
| | |
|---|---|
| *G06F 17/30* | (2006.01) |
| *H04L 29/08* | (2006.01) |
| *H04L 12/58* | (2006.01) |
| *G06Q 10/06* | (2012.01) |

(52) U.S. Cl.
CPC ........... *H04L 67/306* (2013.01); *G06Q 10/06* (2013.01); *G06Q 10/063112* (2013.01); *H04L 51/04* (2013.01); *H04L 67/22* (2013.01)

(58) Field of Classification Search
CPC ....... H04L 67/22; H04L 67/306; H04L 51/04; G06Q 10/00
See application file for complete search history.

(56) References Cited

U.S. PATENT DOCUMENTS

| | | | | |
|---|---|---|---|---|
| 6,754,874 | B1 * | 6/2004 | Richman | G06Q 10/10 715/205 |
| 8,332,261 | B2 * | 12/2012 | Gillam | G06Q 10/00 705/7.38 |
| 9,031,829 | B2 * | 5/2015 | Leydon | G06F 17/28 704/2 |
| 9,881,007 | B2 * | 1/2018 | Orsini | G06F 17/28 |
| 2008/0034061 | A1 * | 2/2008 | Beares | G06Q 30/02 709/218 |
| 2011/0307301 | A1 * | 12/2011 | Laberge | G06Q 10/06393 705/7.39 |
| 2014/0349255 | A1 * | 11/2014 | Watt | G09B 19/18 434/107 |
| 2016/0151704 | A1 * | 6/2016 | Wu | A63F 13/46 463/31 |

* cited by examiner

*Primary Examiner* — Debbie M Le
(74) *Attorney, Agent, or Firm* — Caesar Rivise, PC

(57) ABSTRACT

A communications management apparatus comprises a plurality of clients and a remote server. The server includes a competency data file for storing competencies to be measured for users, a query data file for storing queries associated with competencies, a query engine for selecting queries, and a communications interface for providing the queries for display in succession to message providers, wherein query responses are grouped and feedback is provided to the communications interface for display as a single record by a message recipient.

8 Claims, 16 Drawing Sheets

| Group | Relationship | Competencies | | |
|---|---|---|---|---|
| 1 | P | 1 | 2 | 3 |
| 1 | DR | 4 | 5 | 6 |
| 1 | S | 7 | 8 | 9 |
| 2 | P | 1 | 2 | 10 |
| 2 | DR | 4 | 5 | 11 |
| 2 | S | 7 | 8 | 12 |
| 3 | P | 1 | 13 | 10 |
| 3 | DR | 4 | 14 | 11 |
| 3 | S | 7 | 15 | 12 |
| 4 | P | 16 | 17 | 3 |
| 4 | DR | 18 | 19 | 6 |
| 4 | S | 20 | 21 | 9 |

Figure 2A

UGDF 105

| Group 1 | Members | | |
|---|---|---|---|
| 1 | U1 | U2 | U3 |
| 2 | U4 | U5 | U6 |
| 3 | U1 | U2 | U6 |
| 4 | U1 | U4 | U6 |

Figure 2B

| Group | Relationship | Competencies | | |
|---|---|---|---|---|
| 1 | P | 1 | 2 | 3 |
| 1 | DR | 4 | 5 | 6 |
| 1 | S | 7 | 8 | 9 |
| 2 | P | 1 | 2 | 10 |
| 2 | DR | 4 | 5 | 11 |
| 2 | S | 7 | 8 | 12 |
| 3 | P | 1 | 13 | 10 |
| 3 | DR | 4 | 14 | 11 |
| 3 | S | 7 | 15 | 12 |
| 4 | P | 16 | 17 | 3 |
| 4 | DR | 18 | 19 | 6 |
| 4 | S | 20 | 21 | 9 |

Figure 2C

120 QDF

| Competency | Queries |
|---|---|
| - | - |
| - | - |
| - | - |

Figure 2D

RDF 125

| User Table 127 | | Optional Groups | | | | |
|---|---|---|---|---|---|---|
| User Code | User Name | G1 | G2 | G3 | G4 | G5 |
| U1 | - | | | | | |
| U2 | - | | X | | | |
| U3 | - | | | | | |
| U4 | - | | | 1 | | |
| U5 | - | | | | | 1, 5 |
| U6 | - | 5 | | | | |

Figure 2F

Competency Table            <u>130</u>

| Competency Code | Text |
|---|---|
| 1 | Trust |
| 2 | Emotional Quotient |
| 3 | Communication |
| . | |
| . | |
| . | |

Figure 2G

Aggregation Table – Providers 160

| Message Provider U1 | | | |
|---|---|---|---|
| Message Recipient | Date | Query Responses | Competencies |
| U2 | 12/1/16 | | |
| U3 | 12/2/16 | | |
| Message Provider U4 | | | |
| Message Recipient | Date | Query Responses | Competencies |
| U3 | 12/1/16 | | |
| U6 | 12/2/16 | | |

Figure 2H

Aggregation Table – Recipients 170

| Message Recipient U3 | | | |
|---|---|---|---|
| Message Provider | Date | Query Responses | Competencies |
| U1 | 12/3/16 | | |
| U2 | 12/4/16 | | |
| Message Recipient U6 | | | |
| Message Provider | Date | Query Responses | Competencies |
| U4 | 12/3/16 | | |
| U5 | 12/4/16 | | |

Figure 2I

Aggregation Table – Competencies 180

Message Recipient U3

C1
C2
C3

Message Recipient U6

C4
C5
C6

Provides Feedback That is
timely specific and clear 1.0                              10.0
Text:

Listens Actively 1.0                              10.0
Text:

Courage to state what he/she thinks 1.0                              10.0
Text:

Puts self in other people's shoes 1.0                              10.0
Text:

Figure 4A

You have just received
feedback [from_____]

Click here to view

Figure 4B

Provides Feedback That is
timely specific and clear
9.5
[text]

Listens Actively
9.0
[text]

Courage to state what he/she thinks
8.0
[text]

Puts self in other people's shoes
3.0
[text]

Organizational Success

Align feedback with your organization's competencies and strategies.

COMMUNICATION MANAGEMENT APPARATUS AND METHOD WITH DATA SELECTION BASED ON DATA HIERARCHY

This application claims the priority of U.S. Provisional Patent Application No. 62/299,767 filed on Feb. 25, 2016, which is incorporated herein by reference in its entirety.

FIELD OF THE INVENTION

The present invention relates to communication management and in particular communication management relating to multiple parties. An apparatus and method of communication apparatus is disclosed that provides for selection of message queries based on a message recipient and relationship between message recipient and message provider, grouping of feedback responses, and display of values corresponding to the grouped responses.

BACKGROUND OF THE INVENTION

Message systems, such as email systems or automated questionnaire systems, provide numerous useful features. Email systems, for example, allow one person to message one other person or to message multiple people simultaneously. In one example, multiple email clients are able to communicate with each other through multiple servers that have connectivity with the internet. A user that is operating one email client is able transmit a message to another user that is operating another email client. E-mail communication is useful in certain scenarios, such as when one user desires to provide another user with information, or when one user desires to receive information from another user. E-mail communication is also useful when one user desires to communicate with one other user, or when one user desires to communicate with multiple users. Email, however, may not be appropriate for other, more complex, forms of communication where aggregation of information is desired.

When information is to be aggregated, communication systems have been developed that automate survey administration. While survey applications assist with the acquisition of information, such applications have limitations. Most survey applications provide each user with multiple questions, collect user responses, and then provide reports in which the user responses are aggregated. Such applications, however, have significant manual components, as an administrator needs to create a survey and designate survey participants each time a survey is conducted.

SUMMARY OF THE INVENTION

A communications management apparatus comprises a plurality of clients and a remote server. The server includes a competency data file for storing competencies to be measured for users, a query data file for storing queries associated with competencies, a query engine for selecting queries, and a communications interface for providing the queries for display in succession to message providers, wherein query responses are grouped and feedback is provided to the communications interface for display in succession by a message recipient and/or provider.

BRIEF DESCRIPTION OF THE DRAWINGS

FIGS. 2A, 2B, 2C, 2D, 2E and 2F illustrate exemplary structure of User Group Data File, Competency Data File, Query Data File, Relationship Data File, User Table and Competency Table in accordance with an exemplary embodiment of the present invention.

FIGS. 2G, 2H, and 2I illustrate an exemplary Aggregation Table—Providers and Aggregation Table—Recipients in accordance with an exemplary embodiment of the present invention.

FIG. 4a illustrates how a message recipient is able to receive feedback in real-time in accordance with an exemplary embodiment of the present invention.

FIG. 4b illustrates a message received by a message recipient in accordance with an exemplary embodiment of the present invention.

FIG. 5b is a flowchart diagram that provides further exemplary details regarding step 550 of FIG. 5a.

DETAILED DESCRIPTION

Figure 1A:
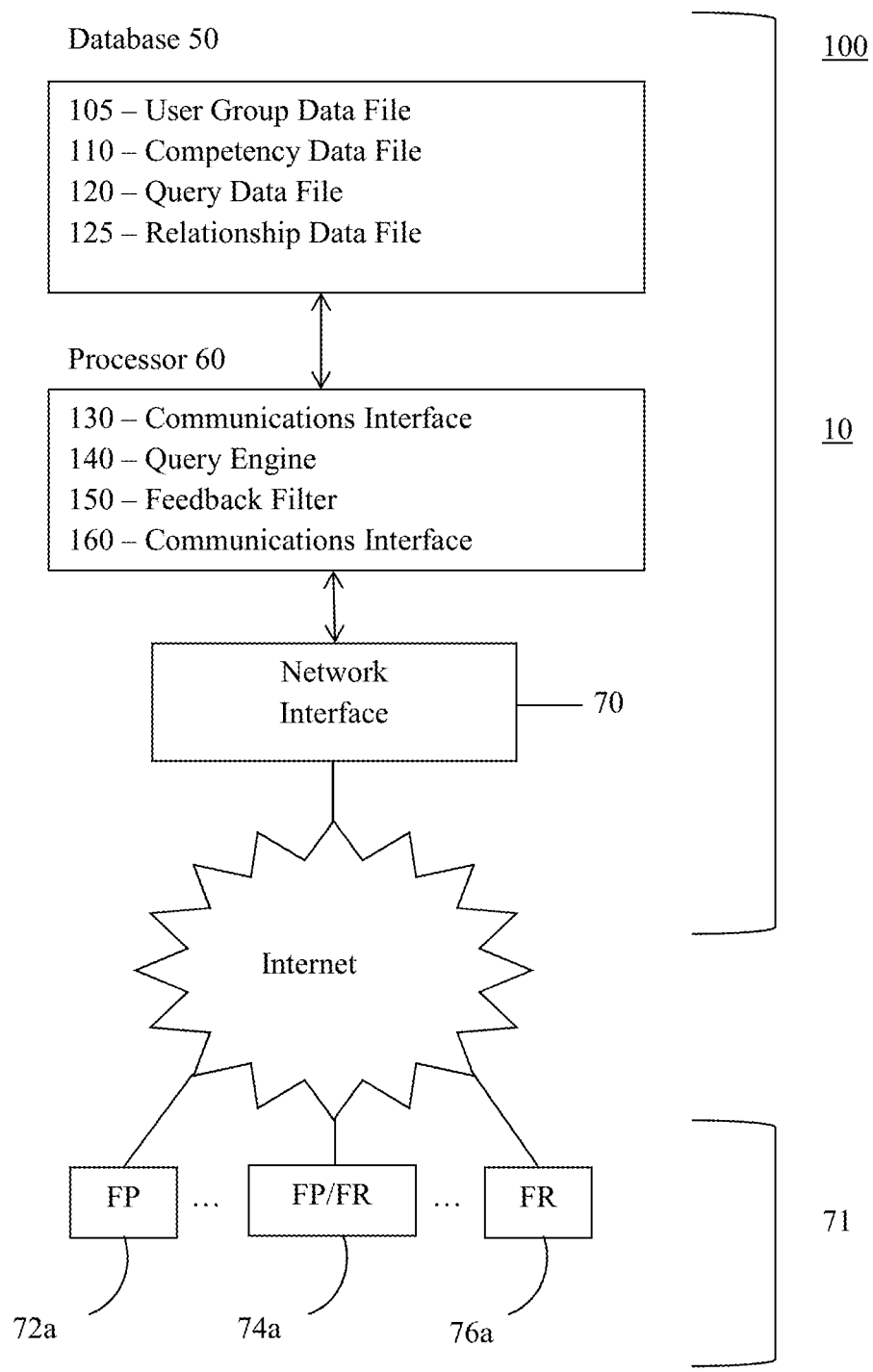
FIG. 1A is a block diagram of a communications management apparatus in accordance with an exemplary embodiment of the present invention.

While current communication management systems achieve numerous advantages, they also have limitations. Prime among the limitations of current communication management systems is their inability to group message content multi-directionally.

As previously explained, e-mail systems readily enable a message to be transmitted to a group. The message sender simply identifies the group to receive the message and message delivery is then attempted to all users of that group. If a group has not been predefined with various message recipients, then message recipients can be designated in the "to" field of the message for subsequent attempted delivery to those recipients. E-mail, however, is accomplished through several discreet actions. A message sender is able to effectively broadcast a message to a group, and upon receipt, a message recipient is ably to reply and send a message back to the message sender. E-mail systems, therefore, are desirable in circumstances where one user is attempted to send a message to another user, or one user is attempting to send messages to multiple users (i.e. of a provider-recipient pair, a third part, etc.).

E-mail, however, is poorly suited for situations where multiple users seek to generate messages and send those messages to a single user. While such messages are capable of being created and sent, the recipient is often left with a collection of messages from multiple users. E-mail applications such as Outlook provide tools for sorting such a collection of messages, but Outlook is poorly suited for integrating the information contained in multiple e-mails received by a message recipient. As an example, when multiple people are providing feedback (i.e. competency measurement) for one individual, e-mail is poorly suited for compiling that feedback.

Software applications that are used for questionnaires are better suited for integrating received information, but such applications still suffer from limitations. Questionnaire administration requires that an individual, group, third party (e.g. HR administrator), etc., decide who will receive a questionnaire, and then that questionnaire is then sent to recipients. The questionnaire is typically available to receive information for a limited time, and then the questionnaire effectively expires, so that further use of the questionnaire is unavailable. Also, when a questionnaire is provided to multiple individuals, the results of the questionnaire are typically delivered to the initial source of the questionnaire. Furthermore, there may be a delay before the questionnaire results are available to the intended recipients of the questionnaire results.

In accordance with an exemplary embodiment of the present invention, a communications management apparatus is provided with an engine that enables feedback to be provided to multiple individuals, wherein each individual receives customized feedback based not only on group membership (i.e. a group that includes as its users the individuals providing feedback and the individuals receiving feedback), but also based on relationships between the individuals in the groups. In a further exemplary embodiment of the present invention, an optional superuser (i.e. third party) may be able to receive the feedback as well. In accordance with further exemplary embodiments of the present invention, such an optional superuser may have access the feedback in various forms. In one form, for example, a super user may be able to view very granular data (e.g. the specific feedback that a message provider provides for a message recipient). In another form, for example, a super user may be able to view statistical data, e.g. averages of numerical data across multiple users such as across multiple message providers, multiple message recipients, one or more groups, portions of one or more groups, exemplary categories of feedback, over specific date ranges, some form of commonality with regard to how the data is provided, etc.

Exemplary embodiments of the present invention can achieve at least portions of the above objectives based on the inclusions of appropriate engines therein. These engines enable improved operation of the hardware components of a communications apparatus in order achieve results not obtained in the prior art. Such engines enable message providers to respond to respective message content and for the responses to the message content to be integrated for improved results. Furthermore, the integration enables analysis with greater speed and efficient than is achieved with the prior art.

FIG. 1A is a block diagram of communication management apparatus 100 in accordance with a first exemplary embodiment of the present invention. Communication apparatus 100 includes processor 60 with features that enable message component delivery and message content integration. Exemplary features included in processor 60 are communications interface 130, query engine 140 and feedback filter 150 the details of which will be described more clearly below. Database 50, processor 60 and network interface 70 may together comprise a server 10. Server 10 may be included, for example, as part of an internet service provider (ISP).

Communications management apparatus 100 includes processor 60 which accesses information from database 50. Processor 60 is also in multi-directional communication with network interface 70. Network interface 70 is able to communicate with clients 71 through an appropriate communications protocol, such as the internet. Clients 71 may be associated with different users for inter-client communication as more clearly described below.

Figure 1B:
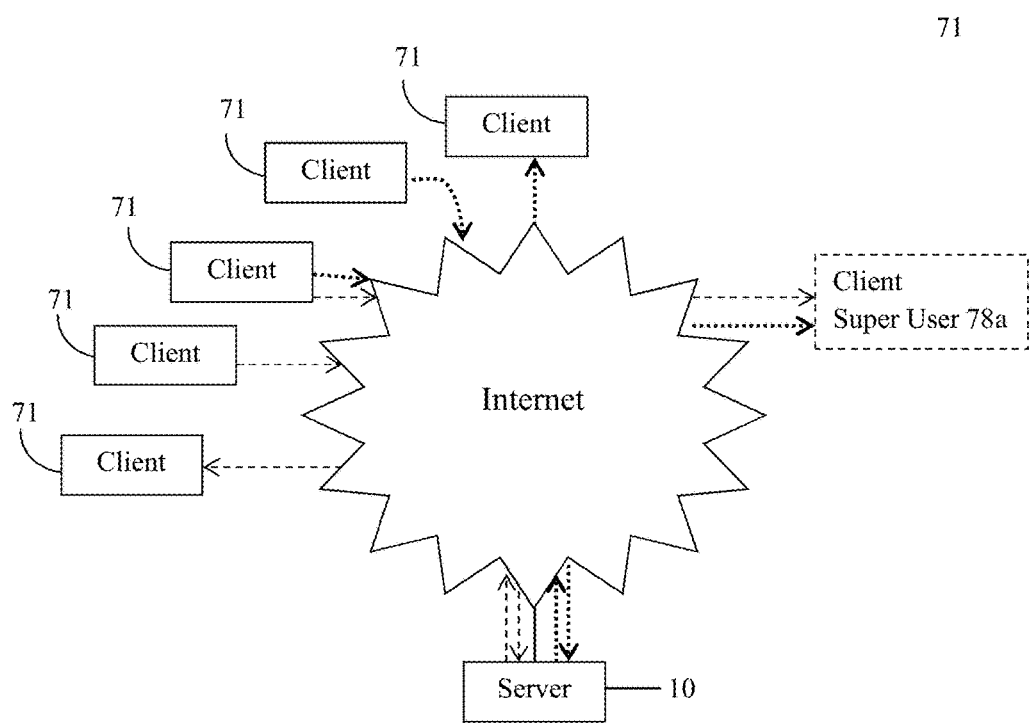
FIG. 1B is a further block diagram of a communication management apparatus in accordance with a further exemplary embodiment of the present invention.

FIG. 1B further illustrates how two clients can provide feedback, shown as the dashed lines directed towards "Internet." Server 10 uses the data from the two clients to generate one report, and transmits the one report first to the Internet and then to client 71, shown as the dashed lines directed towards client 71. FIG. 1B further illustrates how two clients can provide feedback, shown as the dotted lines directed towards "Internet." Server 10 uses the data from the two clients to generate one report, and transmits the one report first to the Internet and then to client 71, shown as the dotted lines directed towards client 71.

Database 50 includes a plurality of data files that are used by processor 60 in order to enable message component delivery and message content integration. The various data files that are included in database 50 are illustrated in FIGS. 2A-D.

FIG. 2A illustrates User Group Data File (UGDF) 105. UGDF 105 includes a list of all users (users) within a group. Group 1 for example includes users U1, U2 and U3. Users may be message providers or message recipients. A user who is a message provider may or may not also be a message recipient. FIG. 2B illustrates Competency Data File (CDF) 110. Different competencies are measured for each group of users. Competencies being measured within a group may be different depending upon the relationship between two users exchanging feedback. In Group 1, for example, if the relationship between two users within the group exchanging feedback (i.e. one group member is providing feedback to another group member) is "(P) peer to peer," then competencies 1, 2, and 3 will be measured. If the relationship between the two users is "(DR) direct report to supervisor," then competencies 4, 5, and 6 will be measured. If the relationship between the two users is "(S) supervisor to direct report," then competencies 7, 8 and 9 will be measured. These relationships are merely exemplary and it is understood that other relationships may exist and may be the basis of measuring competencies. Competencies are different behaviors found, for example, in a working relationship. Exemplary competencies include: leadership, empathy, patience, organization, resourcefulness, etc. FIG. 2C illustrates Query Data File (QDF) 120. QDF 120 illustrates the queries that are associated with each competency. A query may be associated with more than one competency. FIG. 2D illustrates optional Relationship Data File (RDF) 125. RDF 125 stores the relationship between two group users. RDF 125 may be optional if users providing feedback provide the relationship between each other. FIG. 2E illustrates User Table (UT) 127. User Table 127 indicates the user codes that have been associated with each user name, respectively. User Table 127 may optionally include a subtable that indicates which groups are assigned to each username. As previously explained, group assignment is relevant because each group may be associated with measurement of respectively different competencies. In other words, depending upon which group a user is assigned to affects which competencies are measured for that user (by affecting which queries are provided to a message provider for providing feedback regarding the message recipient). FIG. 2F illustrates competency table 130 (which includes a competency data file). Competency table 130 stores the text corresponding to the competency codes that are, in an exemplary embodiment of the present invention, for example, assigned to various groups in Competency Data File 110.

Returning to FIG. 1A, processor 60 includes query engine 140. The purpose of query engine 140 is select queries that will be provided to a message provider so that the feedback provider's feedback can eventually be shared with a message recipient. In order to select the correct queries, query engine 140 evaluates the contents of database 50. The contents of database 50 effectively act as rules so that the appropriate queries can be selected for a message provider. By providing a response to queries by a message provider, it is possible to determine the extent to which a message recipient has achieved certain competencies.

In order to better understand the process of message component delivery and message content integration, a real world example may be helpful.

Employees often provide themselves with goals. They seek to reach their goals and try to determine whether those goals have been met. In an employment situation, however, determining whether goals have been met can be challenging. Assume, for example, that an employee establishes goals for himself in January, but his annual review does not occur until December. Thus, it may take as long as twelve months until that employee receives feedback regarding how well he is achieving the goals he is trying to obtain. During that time period, various employment "events" may occur with regard to that employee. Exemplary events include: meeting project milestones, providing presentations, participating in meetings, submitting reports and/or proposals. An employee may find it useful to receive feedback regarding his performance at each of these events. Yet, it is typical for that employee to need to wait until his annual review to receive any feedback relating to his performance.

Similarly, a supervisor may supervise many employees and he may need to give those employees feedback during their respective annual reviews. Yet, by the time the annual reviews occur, significant time may have passed since employee "events" were observed and the supervisor may have extreme difficulty remembering each "event" and how employees performed. Furthermore, since feedback may not occur until annual reviews, corrective action directed to employee weaknesses may not occur in a timely manner. An employee may achieve some sort of major success, and the feedback for that employee may occur many months later or not at all.

An employee may exhibit a significant weakness, and again, constructive feedback may not be received by the employee for many months (or not at all).

At a department human resources level, a super administrator may need to know how each department of an organization is performing. The supervisor, however, may not receive information about department performance until individual employee reviews are completed. If reviews only occur on an annual basis, the super administrator may need to wait for all reviews to be completed until he has the information that he needs to assess the performance of a department. Furthermore, after all of the reviews have been completed, collecting and analyzing all of the reviews can be difficult and time consuming.

In an exemplary embodiment of the present invention, feedback of an employee can be captured at multiple times. The feedback can be captured, for example, monthly, weekly, daily or even multiple times in a day. In an exemplary embodiment, feedback is captured each time an employee completes a noteworthy event.

One advantage of an exemplary embodiment of the invention is that feedback is captured and facilitated in real time. The feedback can be captured in a manner so that the feedback is publicly available (i.e. shared publicly, such as freely available over the world wide web, for example), and/or the feedback can be captured in a confidential manner (i.e. only available to certain people which, in some embodiments, may be preferred). "Confidential" may refer to information that is password protected, for example, in some manner. Regardless of the accessibility of the feedback, the feedback can be provided on an ongoing basis. In this manner, it is possible to obtain information regarding how others are perceiving an individual's performance as events are happening (i.e. in real time).

Thus, a real time competency based feedback tool is provided so that people can receive ongoing feedback. This may be more desirable than, for example, the static yearly performance reviews that some employees currently receive. Both employers and employees may be frustrated with current feedback systems because feedback may not be available in a timely manner. By providing more timely access to feedback, management of individual performance is enhanced.

Furthermore, timely feedback may be beneficial for an entire organization. Timely feedback can be used to gain insights into competency gaps that might exist based on employee performance. Timely feedback creates an opportunity to identify which employees are having problems in which areas and how those problems are interfering with a company's desire to meet its goals.

The inventors thus desire to create opportunities for continuous actionable insight. This is accomplished via on-demand reporting. At an individual employee level, opportunities are provided for real time level feedback and ongoing development. At a supervisor level, opportunities are provided for measuring team effectiveness and performance management.

In one exemplary embodiment of the present invention, a computer screen is displayed for providing employee feedback. While the term "employee" is used, it is understood that "employee" can be any person within any type of organization that is receiving feedback. The person who is providing the feedback may be referred to as a message provider. The person who is receiving the feedback may be referred to as a message recipient. Feedback is provided to the message recipient in the form of responses or messages. Feedback is transmitted from the message provider, for example, by responding to various inquiries.

Figure 3:
FIG. 3 illustrates queries that are displayed to a message provider in accordance with an exemplary embodiment of the present invention.
Figure 3:
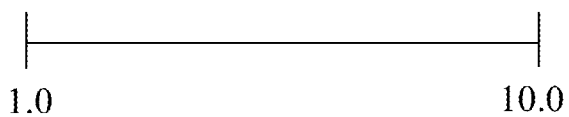
Figure 3:
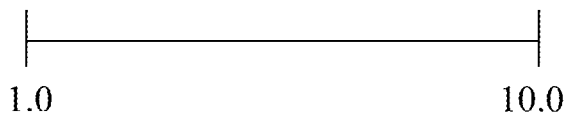
Figure 3:
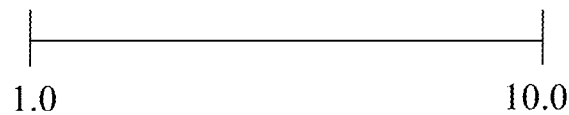

FIG. 3 illustrates exemplary queries (or questions) that are displayed to a message provider. The queries may correspond, for example, to various competencies that are more clearly described below. In short, a plurality of competencies are measured for at least some of the users. The users include message providers that provide feedback and message recipients that receive feedback from message providers. The exemplary competency that relates to the queries in FIG. 3 is "Communication." The message provider may be provided with various user interfaces for responding to each query. In one exemplary embodiment, the message provider can select a "thumbs up" or "thumbs down" icon to communicate his approval is disapproval of the message recipient with regard to the query being asked. An optional field may also be included whereby the message provider can enter custom notes (which the message recipient may be able to see). In another exemplary embodiment, a sliding scale is provided. The message provider can "slide" the scale (for example between 1.0 and a higher number, e.g. 5.0, 10.0, etc.) to provide a number corresponding to how well a message recipient satisfies the query (1.0 may indicate poor satisfaction and the higher number (5.00 or 10.00 for example) may indicate excellent satisfaction). A field may also be provided (i.e. before the queries are displayed) so that the message provider can indicate who the message recipient is (i.e. which message recipient is being evaluated). The "thumbs" icons and the sliding scale are merely exemplary mechanisms for providing feedback. It is understood that feedback may be provided using other mechanisms as well.

FIG. 4a illustrates how a message recipient is able to receive feedback in real-time. In this exemplary screenshot, the message recipient receives a message indicating that he has received feedback. Exemplary messages include "Michael A. has just sent you feedback" or "You have just received feedback." In other words, a message recipient may be contacted with information regarding who provided the feedback, or the message recipient may be contacted anonymously. The message received by the message recipient can be, for example, a link that when clicked will cause the message to be displayed.

FIG. 4b illustrates a message received by a message recipient. The message can include a thumbs up/thumbs down icon, a slider, a numerical or alphanumeric character, some other indication, and/or optionally a textual comment from the message provider. FIG. 2b illustrates that this information may be available in real-time. This information is also stored with other feedback relating to the message recipient so that the message recipient (or a supervisor, or a super administrator) can view the feedback later. In this manner, as well, numerical scores that have been provided to the message recipient as part of his feedback can be subject to data analysis, such as statistical analysis.

Returning again to FIG. 1, processor 60 is shown being able to engage in two way communication with network interface 70. Network interface, in turn, is capable of communicating with various clients 71. Clients 71 includes message provider 72a, message provider/message recipient 74a (i.e. the client 71 is capable of being either a message provider or a message recipient), and message recipient 76a.

The actual process of providing feedback, and subsequently receiving feedback, is illustrated by the flowchart diagram that appears in FIG. 5.

Figure 5A:
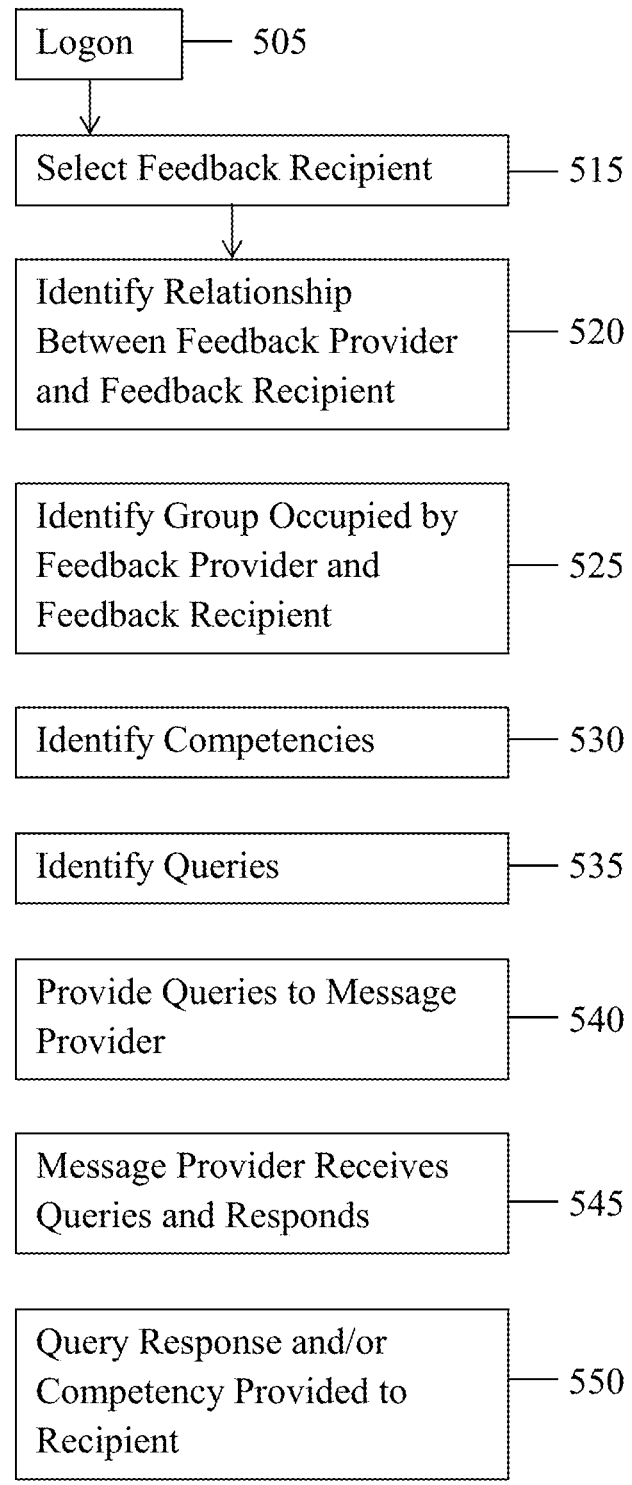
FIG. 5a is a flowchart diagram that illustrates operation of several exemplary embodiments of the present invention.

FIG. 5a is a flow chart diagram that illustrates operation of several exemplary embodiments of the present invention. At step 505, a user who wishes to provide feedback logs in (or logs on). Log in will take place from a client, such as a PC, tablet, cell phone, etc. This step is desirable so that the person logging in is identified with a unique digital code such as a user identification value. The unique digital code will be used, for example, to determine the relationship between the person logging in (i.e. the person or user who will be providing feedback, referred to as the "message provider") and the person or user who will be receiving feedback (referred to as the "message recipient"). At step 515, message provider 72a selects, from a menu, message recipient 76a who will be receiving feedback from message provider 72a. Message recipient 76a may also at some point be a client with an associated user identification value corresponding to a specific user. At step 520, the relationship between message provider 72a and message recipient 76a will be determined. This determination can be made in several different ways. One exemplary method is for a user who is associated with message provider 72a and/or message recipient 76a to manually enter the relationship. Another exemplary method is for the relationship to be prestored within RDF 125 (see FIG. 2D). Thus, for example, if the message provider is identified as U5 and the message recipient is identified as U1, RDF 125 indicates that U1 directly reports to U5. Furthermore, user table 127 may be used. User table 127 translates each user name into a user code. By logging in and supplying a username, the user code for the person logging in is determined from user table 127.

At step 525, message provider 72a and message recipient 76a are evaluated to determine the common group they are both in. This message is optional if all message providers 72a and message recipients 76a can be only in one group (i.e. communications apparatus 100 has been implemented for a single group). This process may proceed in several different ways and examples are provided herein. In one example, corresponding user codes for message provider 72a and message recipient 76a are evaluated within user table 127. User table 127 includes optional Groups fields G1-G5 (for example). The user codes of the respective message provider 72a and message recipient 76a evaluated to identify a common group. The common group will serve as the group for which competencies will be evaluated. If a common group is not found, an error message can be provided, for example, to message provider 72a, with the options of, for example, informing message provider 72a that he is impermissibly attempting to provide feedback outside of his group, permitting message provider 72a to correct the error, offering or suggesting to create a new group, signaling a superuser to create a new group, etc. An alternative method of identifying a common group may be accomplished, for example, with optional UGDF 105 (which is optional is user table 127 is included). Using UGDF 105, each group can be scanned to see if message provider 72a and message recipient 76a are both part of a common group. As a further alternative, message provider 72a and/or message recipient 76a can manually enter their common group.

Competencies will be evaluated by message providers, and the results of the evaluations will be provided to message recipients based on a number of factors, including the group (if any) that a message provider and message recipient share, as well as the relationship between the message provider and message recipient. If, for example, the message provider supervises the message recipient, then the competencies being measured may be different than competencies being when the message recipient supervises the message provider. Thus, once the group and relationship have been established, CDF 110 can be scanned at step 530 to determine the competencies of message recipient 76a that are to be evaluated by message provider 72a. For example, if message provider 72a and message recipient 76a are both in group 2, and message recipient 76a is a supervisor of message provider 72a, then according to CDF 110 message provider will be evaluating competencies 7, 8 and 12. Query engine 140 may perform this step.

At step 535 the queries associated with the competencies identified in step 530 are identified. Identification of queries is accomplished via QDF 120. Query engine 140 may perform this function. Thus, QDF 120 and query engine 140 are behaving as a query filter that selects first ones of the queries from the QDF 120 for ones of the message providers providing feedback to a first of the message recipients based on a first of the relationships stored in a CDF 110.

At step 540, the queries identified in step 535 are provided to message provider 72a. This may be accomplished by communications interface 130. Again, a query data file such as QDF 120 stores a plurality of one or more queries, wherein each of the one or more queries corresponds to a respective one of the competencies. In other words, one or more of the queries may correspond to one competency while one or more of the queries may correspond to another competency. There are many different queries that may be stored within communications apparatus 100. The communications interface provides several ("first ones") of the queries selected by the query engine for display on one of the clients that is message provider 72a. The queries may be displayed in succession via a graphical user interface. "Displayed in succession" may mean that they are all displayed simultaneously (either visible simultaneously or visible by simply scrolling) or it may mean that one query is displayed and then subsequently another query is displayed.

At step 545 the queries are received by message provider 72a and message provider 72a responds to the queries. The response is in the form of feedback, namely quantitative values associated with each one of the received ("first ones") of the queries. Quantitative values can take the form of a "1" or a "0" (as in a yes or a no, or a thumbs up or thumbs down) for example. Quantitative values can be a letter value (as in A through Z where Z, for example, is the highest level of positive feedback). Quantitative values can be an actual number that can be entered by typing in a number (for example) or entering the value with a slide as illustrated in FIG. 3 (e.g. 1=needs significant improvement, 2=could be better, 3=doing OK, 4=very good, 5=awesome). These are merely examples and other quantitative values may also be used.

At step 550, one or more of several options may occur. The quantitative values along with the queries are provided to message recipient 76a. Alternatively, the quantitative values averages from multiple message providers 72a are provided to message recipient 76a. Alternatively, the quantitative values are used to provide message recipient 76a with feedback regarding competencies associated with the queries for which message providers 72a provide feedback. In general, a client associated with message recipient 76a receives and displays in succession results of the message providers 72a responses to the queries that the message providers receive. More particularly, the feedback is aggregated as explained below.

The present invention relates to much more than a questionnaire in which a single group is provided with multiple questions and responses to the questions are tabulated. Such tabulation is readily accomplished simply by including numerous questions in column A of an excel-type spreadsheet and tabulating answers as they are received in columns B, C, etc. One of the objectives of the present invention is to implement a modular, distributed, highly scalable architecture capable of running on multiple platforms. Because the competencies being measured vary depending upon the relationship between message providers and message recipients, an architecture is desirable to permit feedback responses, and/or competency feedback obtained thereby to be presented to a message recipient in a manner that permits the feedback to generated with minimal processing time and minimal processing resources. Therefore, it is desirable for data collection and management to be designed for efficiency to minimize impact on system resources. Accordingly, in one exemplary embodiment of the present invention, competency feedback is aggregated so that feedback for multiple competencies can be displayed in aggregated form. In this manner, for example, feedback can be provided to a message recipient essentially "on-demand" while at the same time eliminating system capacity bottlenecks.

Figure 5B:
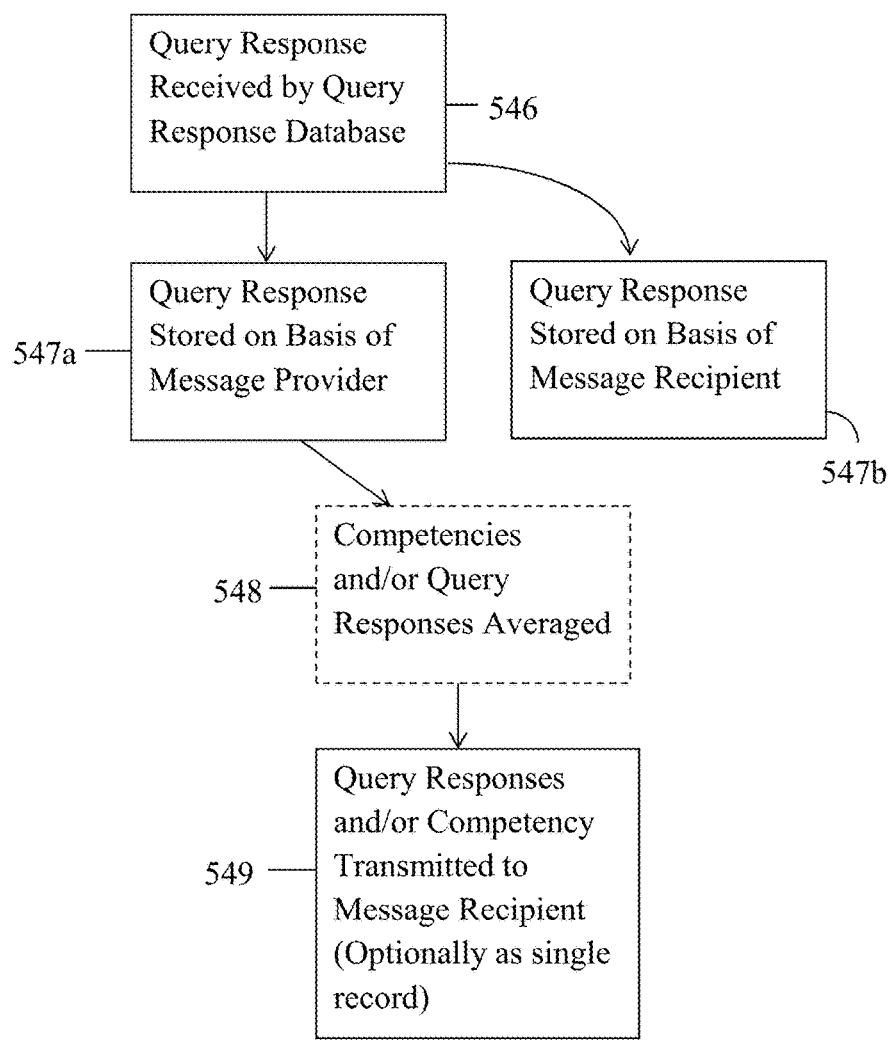

In order to achieve the above objective of eliminating system capacity bottlenecks, FIG. 5b provides further exemplary details regarding step 550 of FIG. 5a. As illustrated at step 545 of FIG. 5a, the message provider receives queries and responds. At step 546 of FIG. 5b, responses to queries are stored in a query response data base. Processing may then proceed to step 547a, 547b, or both. At step 547a, query responses are stored based on the message provider. Thus, all responses provided by a message provider are logically grouped together. From the perspective of multiple message providers, a feedback filter groups according to competencies the received feedback that is received over a time period and at different times from several of the message providers for the message recipients in a common group with the message providers. Alternatively or in addition, at step 547b, query responses are stored based on the message recipient. Alternatively or in addition, query responses are stored based on the message recipient, but feedback for each competency is grouped together. Thus, all responses intended for a message recipient are logically grouped together. At optional step 548, numerical responses to queries (or competencies associated with queries) are combined through, for example (and as previously described) averaging or some other form of statistical analysis. At step 549, the responses to the queries (and/or competencies associated with queries) are transmitted to the message recipient. The transmission may occur based on the data organization resulting from step 547a and/or step 547b and/or the step of grouping together feedback based on competencies and the statistical analysis included in optional step 548. Transmission of feedback regarding the competencies being measured may be performed based on aggregation of data, either aggregation of responses to queries, aggregation of competency feedback resulting from responses to queries by message providers, or both. Grouped feedback is thus provided to a communications interface on the basis of competencies as a single record. The communication interface thus displays the single record for one of the message recipients based on the feedback from the message providers on a client associated with the one of the message recipients. In a further exemplary embodiment of the present invention, data may also be available in a segregated form (i.e. not combined into a single record). In such a form, for example, individual instances of feedback may be available for evaluation.

One of the advantages of the present invention is that multiple message recipients 76a are able to receive feedback regarding competencies and the competencies being evaluated for each message recipient 76a may the same (if group membership allows) or different.

FIG. 5a illustrates a further exemplary embodiment of the present invention that includes optional step 560. Optional step 560 has been included based on the concept of the message recipient initiating the request for feedback from one or more message providers, as opposed to the exemplary embodiment described above in which one or more message providers initiate the providing of feedback to one or more message recipients. In the alternative exemplary embodiment, a message recipient logs on at step 505 and then, at step 560, the message recipient requests feedback from one or more message providers. With reference to "feedback,"

what is included in this term is the request for one or more message providers to provide a message with quantitative information (and other optional information) relating to one or more of the competencies described above. Processing then proceeds to step 520 in which the relationship between message provider(s) and message recipient is identified by one of several means, the group occupied by the message recipient and the message provider(s) is identified, and so on.

In yet another exemplary embodiment of the present invention, a message recipient is able to provide feedback regarding the feedback provided by one or more message providers. Again, the feedback provided by the message recipient may include the message recipient providing a message with quantitative information (and other optional information) relating to the message provided by the message provider, the quantitative information including, for example, subjective assessment of the message provided by the message provider.

Figure 6:
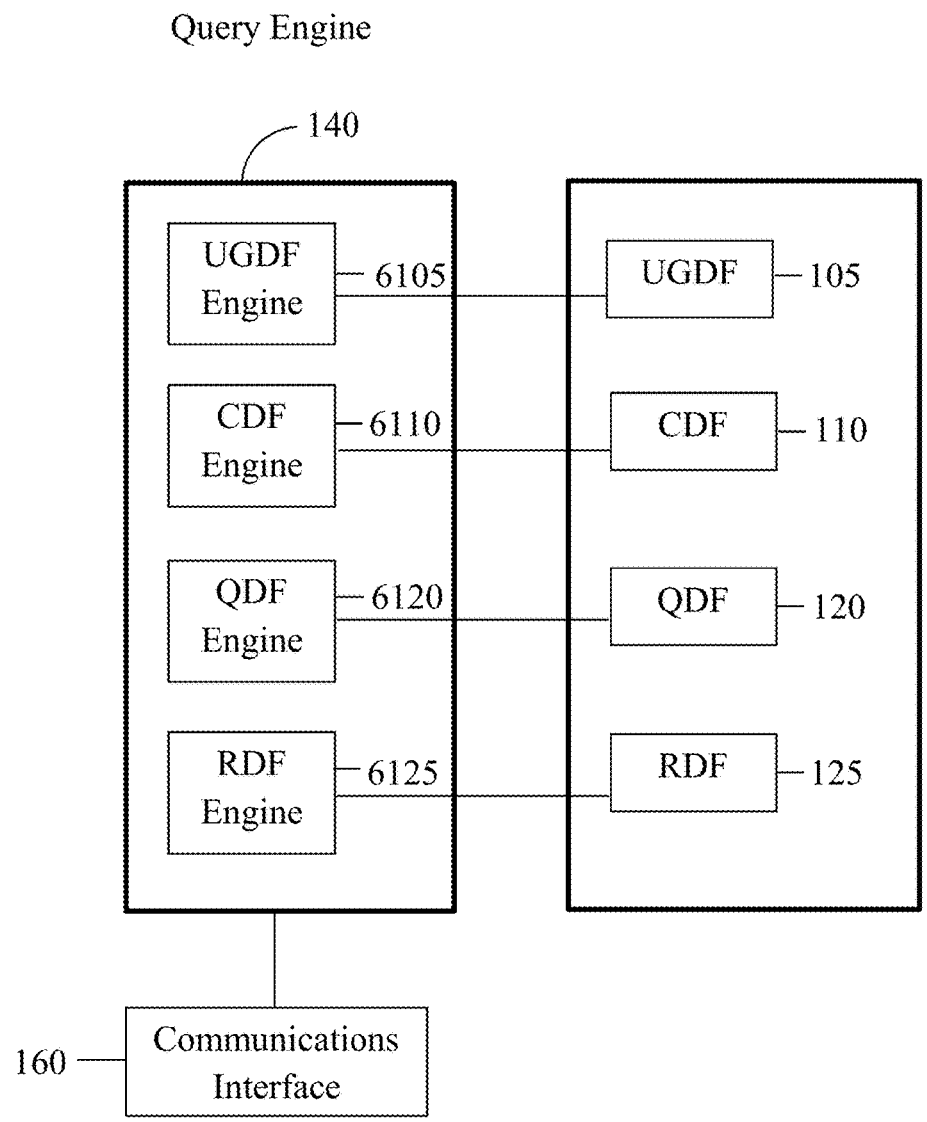
FIG. 6 is a block diagram that illustrates a query engine and a database in accordance with an exemplary embodiment of the present invention.

Query engine 140 is further illustrated in accordance with an exemplary embodiment of present invention in FIG. 6. Database 50 includes, for example, UGDF 105, CDF 110, QDF 120 and RDF 125. The contents of database 50 may vary depending upon which embodiments are being practiced and/or which optional features are included/excluded. Database 50 is coupled to processor 60 that includes display query engine 140 and communications interface 130 (described below). Query engine 140 communicates with user interfaces 72a, 74a and 76a via network interface 70 (shown in FIG. 1). User interfaces can include any type of input/output (I/O) device including I/O devices such as message provider 72a, message provider/recipient 74a and/or message recipient 76a.

UGDF engine 6105 communicates with UGDF 105 in order to store, locate and retrieve data from UGDF 105. CDF engine 6110 communicates with CDF 110 in order to store, locate and retrieve data from CDF 110. QDF engine 6120 communicates with QDF 120 in order to store, locate and retrieve data from QDF 120. RDF engine 6125 communicates with RDF 125 in order to store, locate and retrieve data from RDF 125.

Figure 7:
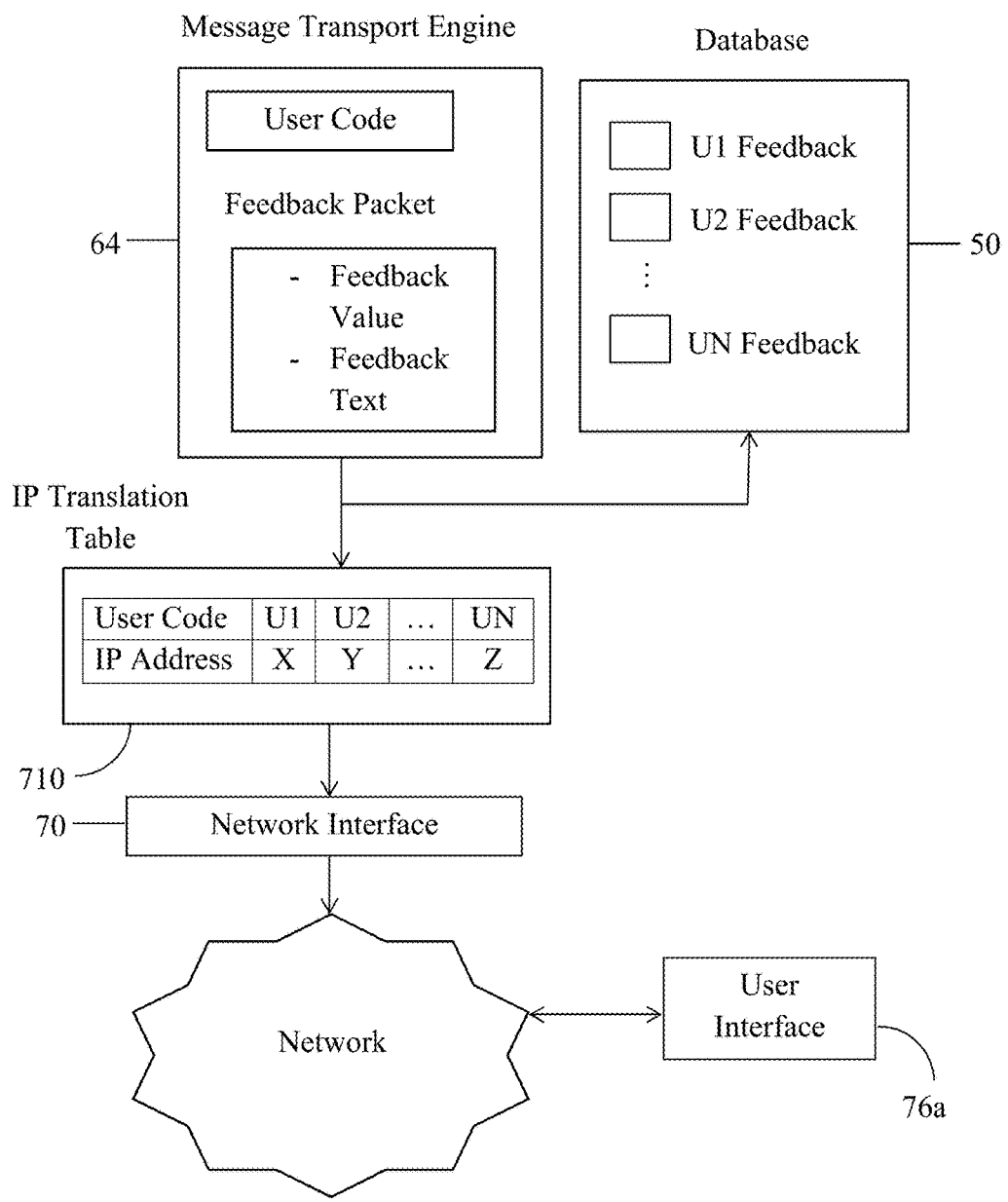
FIG. 7 is a block diagram of a communications interface in accordance with an exemplary embodiment of the present invention.

Communications interface 130 is illustrated in FIG. 7. Message transport 64 collects the answers that the message recipient provides responsive to the questions from the question display engine 820. A feedback packet is assembled by the message transport engine 64 based on the answers provided by the message provider. The packet includes a feedback value and may also include feedback text. The feedback value may include a 1 or a 0 (based on thumbs up/thumbs down responses) for example, a value between, for example, 1 and (a higher value such as) 10 (based on a slider-type feedback) and/or text. Multiple answers to questions may be assembled in their own respective feedback packets.

Each message packet (i.e. aggregated data) may be transmitted to database 50 for storage and later retrieval. Storage may be indexed, for example on the basis of the message recipient, the message provider, the group (and optionally subgroup) to which the message recipient belongs, etc. For example, the data included in each message packet may be aggregated for storage in Aggregation Table—Providers 160 and/or Aggregation Table Recipients 170 and/or Aggregation Table Competencies 180. Table 160 may be indexed based on message provider and may include, for example, message recipient, date, query responses, and numeric value corresponding to measured competencies (raw or averaged). Table 170 may be indexed based on message recipient and may include, for example, message provider, data, query responses, and numeric value corresponding to measured competencies (raw or averaged). Table 180 may be indexed based on message recipient and respective competencies being measured for each message recipient. Tables 160, 170 and 180 are illustrated in FIGS. 2G, 2H, and 2I respectively.

Each message packet may also be transmitted to the message recipient at the user interface 76a. The message is routed to the message recipient via IP translation table 10 (that translates user codes into IP addresses where the message recipient is receiving messages (either via a log on or by clicking on a link embedded, for example, in a text message or email)). The network may be a private network or a public network such as the internet.

An additional option is for users to be able to construct their own groups. An administrator may be able to identify a user code associated with a user (in the manner described above) and designate to which group(s) (or subgroup(s)) the user code is associated with.

Alternatively, the query filter selects another "one or more" queries from the query data file for message providers to provide feedback to another message recipient based on another set of relationships. The communication interface is further for providing the another "one or more" queries for display by another one of the clients, and the communication interface displays the feedback as aggregated competencies for the another message recipient.

Alternatively, the query filter is further selecting a third "one or more" queries from the query data file for other message providers to provide feedback based on a third of the relationships with the first message recipient. The communications interface displays together the third "one or more" of the queries on one of the clients corresponding to the first of the message recipients according to competencies to be measured by other message providers.

To summarize for a first group of message providers with a first relationship with a first message recipient, query set 1 is evaluated. For a first group of message providers with a second relationship with a second message recipient, query set 2 is evaluated. For a second group of message providers with a first relationship with a third message recipient, query set 3 is evaluated.

Figure 8:
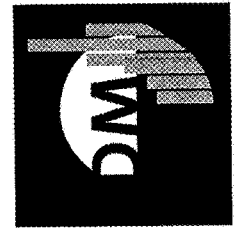
FIG. 8 is an exemplary illustration of how queries may appear to a messaging provider and/or messaging recipient in accordance with an exemplary embodiment of the present invention.
Figure 8:
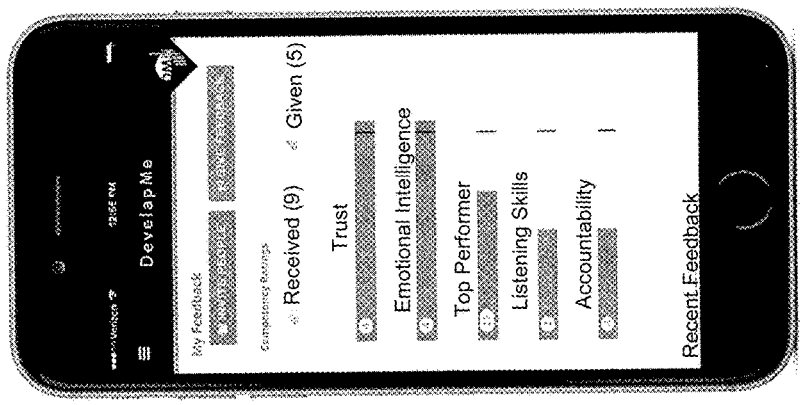

FIG. 8 illustrates an exemplary embodiment of the present invention in which competencies are displayed in succession to a group member. In the illustrated form of display in succession, scores for several competencies are being displayed simultaneously, although it is understood that in an alternative embodiment the competencies are displayed in a serial fashion. Furthermore, in the illustrated embodiment, what is being displayed are averages of competencies based on feedback from multiple message providers. The illustrated embodiment is merely exemplary, as the display could have instead displayed competencies based on feedback from a single message provider (i.e. display of competencies based on feedback from one message provider and later display of competencies based on feedback from another message provider). In the display, competencies are displayed on a bar graph to illustrate to what extent each competency has been made. Again, the bar graph is merely exemplary.

As shown near the top of the screen that is illustrated in FIG. 8, an exemplary embodiment includes the ability to invite group users to provide feedback by assuming the role of message providers. Furthermore, another exemplary embodiment enables a user to become a message provider (through the "give feedback" button that is illustrated) and to provide feedback for another user in a common group.

One exemplary embodiment includes an appropriate mechanism to translate query responses into scores that are displayed for competencies. In one embodiment, for example, there may be a one-to-one correspondence. In other words, one query corresponding to a competency is used to measure the competency and the answer to the query is used as a "score" for displaying extent to which that competency has been met. In another embodiment, answers to multiple queries are used to calculate a "score" for displaying extent to which the competency has been met, the calculation assuming a variety of different forms, such as an average, a weighted average, etc.

Figure 9:
FIG. 9 is an exemplary illustration of how competencies are displayed to a messaging third party, such as a superuser in accordance with an exemplary embodiment of the present invention.

FIG. 9 illustrates a further exemplary embodiment in which competency scores are displayed. The view shown in FIG. 9 may be, for example, from a superuser perspective. In the illustrated embodiment, the competency scores have been averaged based on responses to queries received from multiple message providers. FIG. 9 also illustrates that when message providers respond to queries, they may not only provide feedback in the form of numerical data, but they may provide text comments as well. These text comments may optionally be displayed to the message recipient. As shown, it is also possible to indicate for a message recipient total numbers of types of feedback received (e.g. few scores indicating "needs significant improvement", slightly more scored for "doing OK and "could be better," many scores or "very good" and the highest number of scores for "awesome."). It is possible to count how many text comments have been received. It is possible to store competencies for specific periods of time and to generate a graph that illustrates how competencies have changed over time. Also, one embodiment, competencies are averaged and displayed over specific periods of time. To display such information, it is desirable to store data corresponding to competencies in memory for specific times and/or dates.

One of the exemplary features illustrated in FIG. 9 is the ability to average together scores that have been received for different users and to display those averages. In addition, FIG. 9 illustrates exemplary simultaneous display of averages for a plurality of competencies. In one exemplary embodiment, the scores that have been averaged together are for a common set of competencies that are measured within a group. For an embodiment of the invention that includes multiple groups, each with their own respective competencies that are measured, averages for competencies for any one particular group may be displayed simultaneously. The exemplary display illustrated in FIG. 9 may also be with regard to competencies that are measured for one particular relationship: P, DR, or S. Average scores may alternatively (or in addition) be shown based on competency, based on relationship, for one or more particular individuals, etc. Average competency scores calculated on any of the above basis may also be tracked (and displayed) over time. Thus, in this exemplary embodiment, the received feedback is averaged for multiple ("ones") message recipients and displayed as a single record for multiple ("ones") competencies.

In the exemplary embodiment illustrated in FIG. 9, mean scores (by competency, over time) are illustrated. It is understood, however, that other quantitative (and optionally qualitative) data may be included, such as calculations (e.g. statistical calculations) such as over particular time periods, on a month to month basis, on a year to year basis, and/or on a percentage basis of comparison, etc.

In a further exemplary embodiment of the present invention, a "virtual coach" may be included. In such an embodiment, software monitors query responses from message providers to detect downward trends and upward trends in those responses. If the responses provided by message providers are going down over time, the virtual coach software can transmit a warning. If the responses provided by message providers are going up over time, the virtual coach software can transmit positive feedback.

In a further exemplary embodiment, a message receiver can enter goals at the beginning of a time period, and the embodiment can evaluate responses to queries over time to determine whether and to what extent those goals are being (or have been) met.

Figure 10:
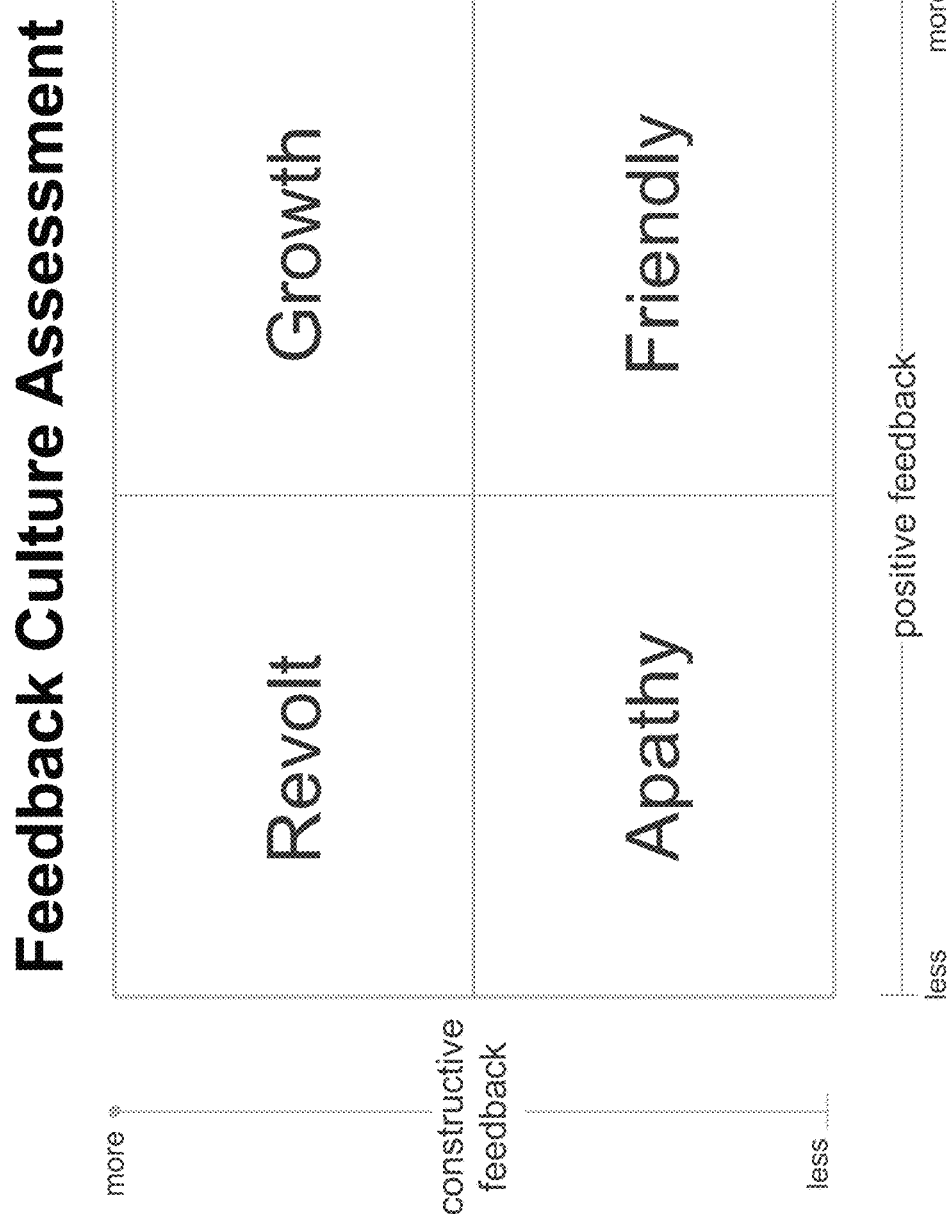
FIG. 10 is an exemplary illustration of how quantity of feedback of feedback content may be used to characterize feedback in accordance with an exemplary embodiment of the present invention.

Yet another exemplary embodiment is illustrated in FIG. 10. Using the graph shown in FIG. 10, it is possible to provide a visual display of extent to which responses to queries indicate revolt, apathy, growth, and friendliness. Quantity of feedback can be plotted along the x-axis and value associated with feedback can be plotted along the y-axis. Consistently high feedback scores may indicate friendly or growth. Consistently low feedback scores may indicate apathy or revolt.

Fewer times that feedback is given can indicate apathy or revolt. More frequent times that feedback is given can indicate growth or friendliness, or revolt.

By grouping together messages as described in the above exemplary embodiments, certain technical advantages are achieved over the prior art. For example, such grouping leads to microprocessor based processing of the data with improved speed and efficiency over the prior art, because the grouping allows related messages (i.e. related based on common message recipient, for example) to be displayed without having to search through larger quantities of data (that may include related data and unrelated data). In addition, the grouping of messages enables faster retrieval because fewer memory accesses may occur and thus memory retrieval latency becomes less of an issue.

While the present invention has been described herein with reference to exemplary embodiments, it should be understood that the invention is not limited thereto. Those skilled in the art with an access to the teachings herein will recognize additional modifications, applications, and embodiments within the scope thereof and additional fields in which the invention would be useful.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The present application has set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. Communication management apparatus, comprising,
    a plurality of clients, each associated with respectively different user identification values corresponding to respective users;
    A remote ISP server, including:
        a competency data file for storing a plurality of competencies to be measured for at least ones of said users, wherein said users include message providers that provide feedback and message recipients that receive feedback from message providers, and wherein said competencies are assigned to said message recipients based on respective relationships with said message providers;
        a query data file for storing a plurality of one or more queries, wherein each of said one or more queries corresponds to a respective one of said competencies;
        a communications interface for receiving said user identification values from said clients;
        a query filter for selecting first ones of said queries from said query data file for ones of said message providers providing feedback to a first of said message recipients based on a first of said relationships stored in said competency data file;
    said communications interface further for providing said first ones of said queries selected by said query filter for display in succession by ones of said clients associated with said ones of said message providers via a graphical user interface, and, responsive thereto, for receiving feedback from said message providers wherein said feedback includes quantitative values associated with said first ones of said queries;
    a feedback filter for grouping according to competencies said received feedback that is received over a time period and at different times from said ones of said message providers for said first of said message recipients as grouped feedback and providing said grouped feedback according to said competencies as a single record to said communication interface,
    wherein said communication interface displays said single record for said first of said message recipients from said different ones of said message providers on a first of said clients associated with said first of said message recipients; and
    wherein said relationships are included in a set of relationships and a combination of one of said message providers providing feedback to one of said message recipients is defined as one of said relationships from said set.

2. Communication management apparatus according to claim 1, wherein said query filter is also for selecting second ones of said queries from said query data file for ones of said message providers providing feedback to a second of said message recipients based on a second of said relationships, and wherein said communications interface is further for providing said second ones of said queries for display in succession by ones of said clients, and said communication interface displays said feedback as grouped ones of said competencies as a single record for said second of said message recipients.

3. Communication management apparatus according to claim 1, wherein said query filter is for selecting third ones of said queries from said query data file for others of said message providers based on a third of said relationships with said first of said message recipients, and wherein said communications interface displays in succession said third ones of said queries on said first of said clients corresponding to said first of said message recipients according to competencies to be measured by said others of said message providers.

4. Communication management apparatus according to claim 1, wherein said received feedback is averaged for ones of said message recipients and displayed as a single record for ones of said competencies.

5. A method of communication management for use with a plurality of clients, each associated with respectively different user identification values corresponding to respective users, said method comprising the steps of:
    a) storing a plurality of competencies to be measured for at least ones of said users, wherein said users include message providers that provide feedback and message recipients that receive feedback from message providers, and wherein said competencies are assigned to said message recipients based on respective relationships with said message providers
    b) storing a plurality of one or more queries, wherein each of said one or more queries corresponds to a respective one of said competencies;
    c) receiving said user identification values from said clients;
    d) selecting first ones of said queries from said query data file for ones of said message providers providing feedback to a first of said message recipients based on a first of said relationships;
    e) providing said first ones of said queries selected by said query filter for display in succession by ones of said clients associated with said ones of said message providers via a graphical user interface, and, responsive thereto, for receiving feedback from said message providers wherein said feedback includes quantitative values associated with said first ones of said queries;
    f) grouping according to competencies said received feedback that is received over a time period and at different times from said ones of said message providers for said first of said message recipients as grouped feedback and providing said grouped feedback as a single record according to said competencies;
    g) wherein said single record is displayed for said first of said message recipients from said different ones of said message providers on a first of said clients associated with said first of said message recipients, and wherein said relationships are included in a set of relationships and a combination of one of said message providers providing feedback to one of said message recipients is defined as one of said relationships from said set.

6. A method of communication management according to claim 5, further comprising the steps of selecting second ones of said queries for ones of said message providers, providing feedback to a second of said message recipients based on a second of said relationships, providing said second ones of said queries for display in succession by ones of said clients, and displaying said feedback as grouped ones of said competencies in succession for said second of said message recipients.

7. A method of communication management according to claim 5, further comprising the steps of selecting third ones of said queries from said query data file for others of said message providers based on a third of said relationships with said first of said message recipients, and displaying in succession said third ones of said queries on said first of said clients corresponding to said first of said message recipients according to competencies to be measured by said others of said message providers.

8. A method of communication management according to claim 5, wherein said received feedback is averaged for ones of said message recipients and displayed as a single record for ones of said competencies.

* * * * *